UNITED STATES PATENT OFFICE.

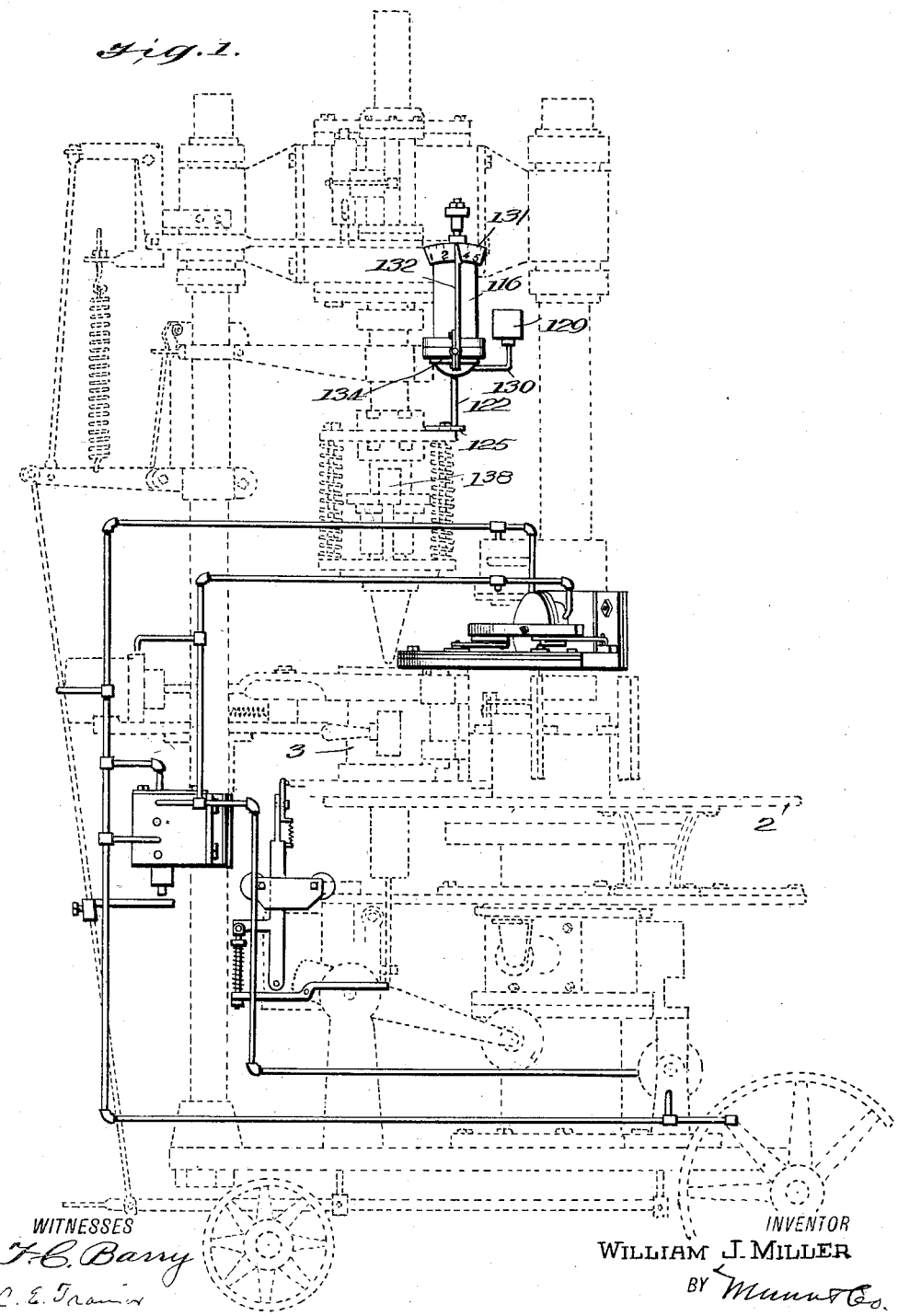

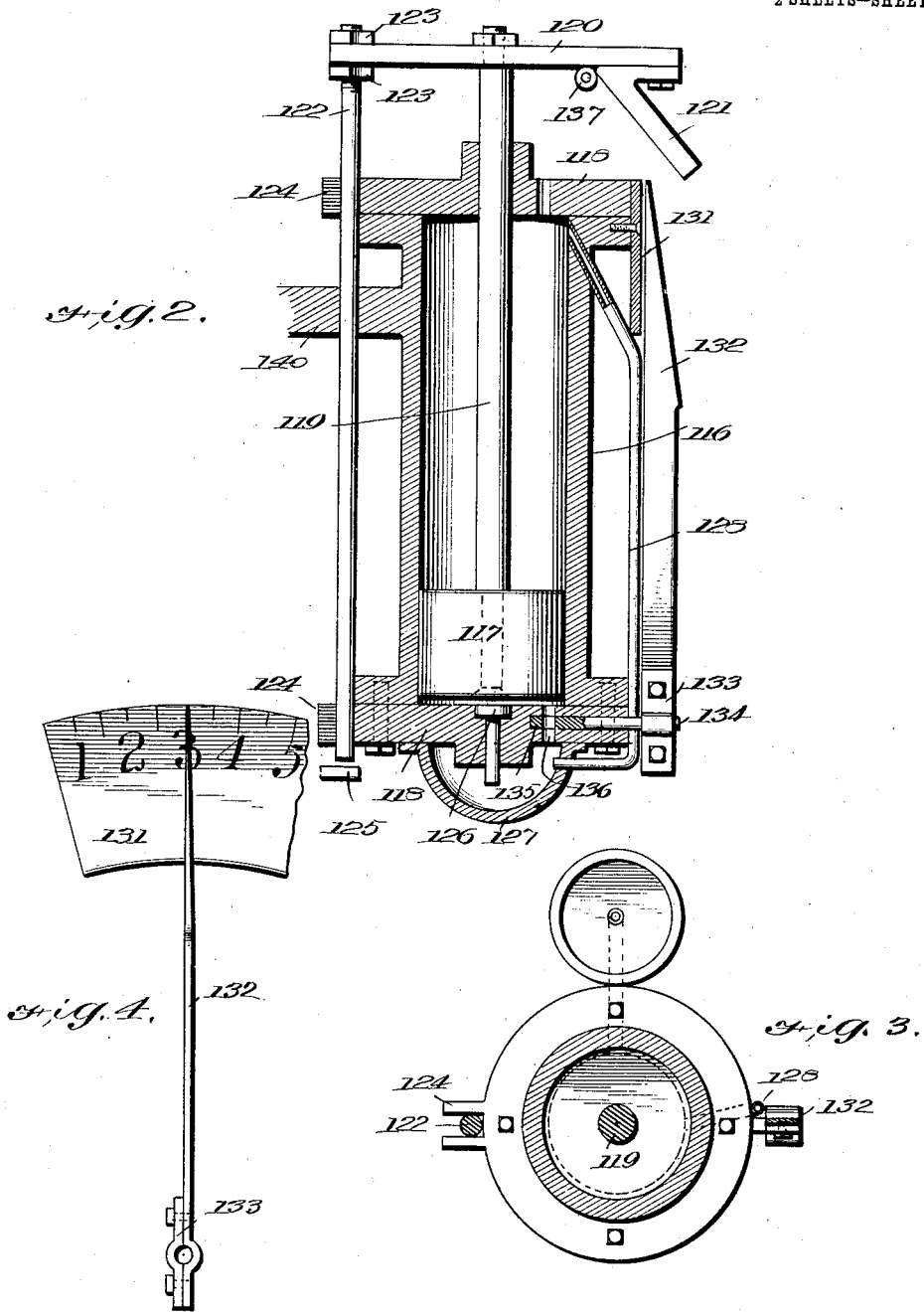

WILLIAM J. MILLER, OF COFFEYVILLE, KANSAS.

GLASS-MOLDING MACHINE.

941,935.  Specification of Letters Patent.  Patented Nov. 30, 1909.

Application filed February 17, 1909. Serial No. 478,407.

*To all whom it may concern:*

Be it known that I, WILLIAM J. MILLER, a citizen of the United States, and a resident of Coffeyville, in the county of Montgomery and State of Kansas, have invented certain new and useful Improvements in Glass-Molding Machines, of which the following is a specification.

My invention is an improvement in glass molding machines and consists in certain novel constructions and combinations of parts hereinafter described and claimed.

The object of the invention is to provide a mechanism for regulating the moment when the forming plunger shall be withdrawn from the mold, in machines of the type shown in Patent No. 787,050, of April 11, 1905.

Referring to the drawings forming a part hereof, Figure 1 is a side view of a portion of a molding machine provided with the improvement, the novel features being shown in full lines; Fig. 2 is a longitudinal section of the improvement; Fig. 3 is a section on the line 3—3 of Fig. 2; Fig. 4 is a front view of the scale indicator.

The present embodiment of the invention is shown applied to a machine consisting of an intermittently rotating table 2, provided with a plurality of molds 3, into each of which a charge of molten glass is inserted at a point in the movement of the table, and at the next position of the table a forming plunger is moved into the mold to roughly form the article, which is completely formed at the next station by the blowing mechanism.

The present embodiment of the invention comprises a cylinder 116, in which is movable a piston 117, the cylinder being provided with heads 118, through the upper of which passes the stem 119, of the piston, and the outer end thereof is connected with a cross head 120, having on one end thereof a cam 121, the other end being traversed by a rod 122, which is secured in place by nuts 123 and passes through bearings in lugs 124 extending from the heads of the cylinder, the lower end of the rod being adapted for engagement by a bracket 125 secured to the forming plunger.

The cylinder is provided in its lower end with a port normally closed by a check-valve 126, and the port communicates with a cup 127 secured to the cylinder head, and the cup is connected by a pipe 128 with the upper end of the cylinder, and a storage tank 129 for a suitable fluid is connected by a pipe 130 with the cup 127 before mentioned. The function of the pipe 128 is to make the upper end of the cylinder act as an auxiliary storage tank, and by using the said pipe the storage tank may be dispensed with, the fluid in such case passing from the top to the bottom of the cylinder instead of from the storage tank to the cylinder. A scale 131 is secured to the upper end of the cylinder, and a pointer 132 coöperates with the scale, the pointer being secured as at 133 to the stem 134 of a valve 135, which controls a passage 136 leading directly from the lower end of the cylinder to the cup. By adjusting the pointer on the scale, the valve may be set to open any desired distance whereby to permit a greater or lesser flow of fluid.

When the plunger ascends, the bracket 125 engages the lower end of the rod 122, moving the same upward and with it the piston 117, as also the cam 121. Liquid flows from the storage tank into the cup, past the check valve and through the passage 136 into the lower end of the cylinder. When the forming plunger again descends, the liquid must be forced out through the passage 136, which is more or less closed by the movement of the pointer. The piston 117 is of such weight, that its descent will force out the liquid, unless the passage is entirely closed in which case the piston would be blocked. When, however, the valve is opened, even to the smallest extent, the liquid is gradually forced out. The lever 137 which admits fluid to the lower end of the cylinder 138 that operates the forming plunger, is engaged by the cam 121 as the piston 117 is reaching the lower end of the cylinder and is moved by such cam whereby to operate the forming plunger. It will be evident that by moving the pointer more or less to close the passage 136, the commencing of the rising movement of the plunger may be nicely calculated and adjusted. The crosshead 120 may be provided with an inclined cam as shown in Fig. 2, or may be of any other suitable shape or construction. The cylinder 116 is connected with the cylinder which operates the forming plunger by means of a suitable plate 140.

In operation when a mold reaches the charging position, a gatherer places a charge in the mold, and at the same time starts the table operating mechanism. The table is at once partially rotated to bring the charge into position for pressing, and the pressing operation is continued a predetermined time according as the pointer is adjusted with reference to the scale. When the piston reaches the lower end of the cylinder of the timing device, it shifts the valve which controls the forming plunger cylinder, and the forming plunger is raised.

I claim:

1. In a machine of the class described, a mold, a forming plunger for coöperating with the mold, fluid operated means for moving the former into and out of the mold, a valve for controlling said means, and a means for varying the duration of the stay of the plunger in the mold, said means comprising a cylinder, a piston therein, a reservoir for fluid communicating with the lower end of the cylinder, a check valve in the communication, means whereby the upward movement of the plunger will lift the piston and permit the fluid to enter the cylinder, an outlet for the fluid, means for restricting the outlet, means outside of the cylinder for indicating the extent of the restriction, and means in connection with the piston for operating the valve when the piston is in its lowest position.

2. In a machine of the class described, a mold, a forming plunger for coöperating with the mold, fluid operated means for moving the former into and out of the mold, a valve for controlling said means, and a means for varying the duration of the stay of the plunger in the mold, said means comprising a cylinder, a piston therein, a reservoir for fluid communicating with the lower end of the cylinder, a check valve in the communication, means whereby the upward movement of the plunger will lift the piston and permit the fluid to enter therein, an outlet for the fluid, means for restricting the outlet, and means in connection with the piston for operating the valve when the piston is in its lowest position.

3. In a machine of the class described, a mold, a forming plunger for coöperating therewith, fluid operated means for moving the plunger into and out of the mold, a valve for operating said means, and means for varying the duration of the stay of the plunger in the mold, comprising a cylinder, a piston therein, means connected with the piston for engagement by the plunger on its upward movement to move the piston therewith, said plunger being freely movable by gravity in a downward direction, means for restricting the movement of the plunger in a downward direction and means whereby the piston will operate the valve at the conclusion of its movement in the downward direction.

4. In a machine of the class described, a mold, a forming plunger for coöperating therewith, fluid operated means for moving the plunger into and out of the mold, a valve for operating said means, and means for varying the duration of the stay of the plunger in the mold, said means comprising a piston, normally freely movable in a downward direction, a fluid check for restraining said downward movement, means for adjusting the check whereby to vary the speed of the piston, means in connection with the piston for engagement by the plunger to move said piston in an upward direction and means in connection with the piston for operating the valve when in its lowermost position.

5. In a machine of the class described, a mold, a forming plunger for coöperating therewith, fluid operated means for moving the plunger into and out of the mold, a valve for operating said means, and means for varying the duration of the stay of the plunger in the mold, said means comprising a piston normally freely movable in a downward direction, a fluid check for restraining said downward movement, means in connection with the piston for engagement by the plunger to move said piston in an upward direction, and means in connection with the piston for operating the valve when in its lowermost position.

WILLIAM J. MILLER.

Witnesses:
  Geo. J. Magly,
  Peter J. Magly.